United States Patent [19]

Wiese

[11] Patent Number: 5,246,041
[45] Date of Patent: Sep. 21, 1993

[54] SLIDE GATE AND DUST COVER OPERATOR AND SEAL ASSEMBLY

[75] Inventor: Delmar R. Wiese, Springfield, Mo.

[73] Assignee: Custom Metalcraft Inc., Springfield, Mo.

[21] Appl. No.: 850,859

[22] Filed: Mar. 13, 1992

Related U.S. Application Data

[62] Division of Ser. No. 727,925, Jul. 10, 1991, Pat. No. 5,095,954, which is a division of Ser. No. 476,574, Feb. 7, 1990, Pat. No. 5,042,538.

[51] Int. Cl.⁵ ............................................. B65B 1/04
[52] U.S. Cl. ................................. 141/1; 141/89; 141/93; 141/287; 141/312; 141/368; 251/159; 251/172; 137/240
[58] Field of Search ............... 141/1, 85, 89, 93, 91, 141/287, 312, 368; 251/159, 172, 328; 137/240; 414/292, 221, 411, 414

[56] References Cited

U.S. PATENT DOCUMENTS

| | | | |
|---|---|---|---|
| 2,908,299 | 10/1959 | Gosselin | 141/287 |
| 2,955,796 | 10/1960 | Titchenal | 141/287 X |
| 3,103,958 | 9/1963 | Rath | 141/312 X |
| 3,354,918 | 11/1967 | Coleman . | |
| 3,367,625 | 2/1968 | Fortune | 251/328 X |
| 3,513,143 | 6/1950 | Carter | 141/287 X |
| 3,729,121 | 4/1973 | Cannon . | |
| 3,752,178 | 8/1973 | Grove et al. | 251/328 X |
| 3,765,647 | 10/1973 | Grove et al. | 251/328 X |
| 3,985,245 | 10/1976 | Schulte . | |
| 4,054,161 | 10/1977 | Alack | 141/12 |
| 4,163,458 | 8/1979 | Bachmann | 137/240 |
| 4,182,386 | 1/1980 | Slack | 141/83 |
| 4,249,679 | 2/1981 | Dillman | 222/542 |
| 4,428,504 | 1/1984 | Bassett et al. | 222/55 |
| 4,469,152 | 9/1984 | Hardee et al. | 141/312 |
| 4,491,253 | 1/1985 | Coleman | 222/559 |
| 4,582,451 | 4/1986 | Hollander, Jr. | 251/328 X |
| 4,703,782 | 11/1987 | Henkel, Sr. | 141/65 |
| 4,724,863 | 2/1988 | Connor | 137/240 |
| 4,825,913 | 5/1989 | Stott | 141/59 |
| 4,830,233 | 5/1989 | Thelen et al. | 222/450 |
| 4,854,353 | 8/1989 | Russell | 141/74 |

Primary Examiner—Henry J. Recla
Assistant Examiner—Casey Jacyna
Attorney, Agent, or Firm—Nies, Kurz, Bergert & Tamburro

[57] ABSTRACT

Apparatus for providing a dust free environment in the filling and discharge of bins and other containers is disclosed. The apparatus includes a dual seal which seals directly against a gate assembly. The invention also provides for the introduction of air between inner and outer seals to prevent contaminants from reaching the product. Dust covers are employed on the fill station and discharge station and also on the fill and discharge ends of the bin.

2 Claims, 7 Drawing Sheets

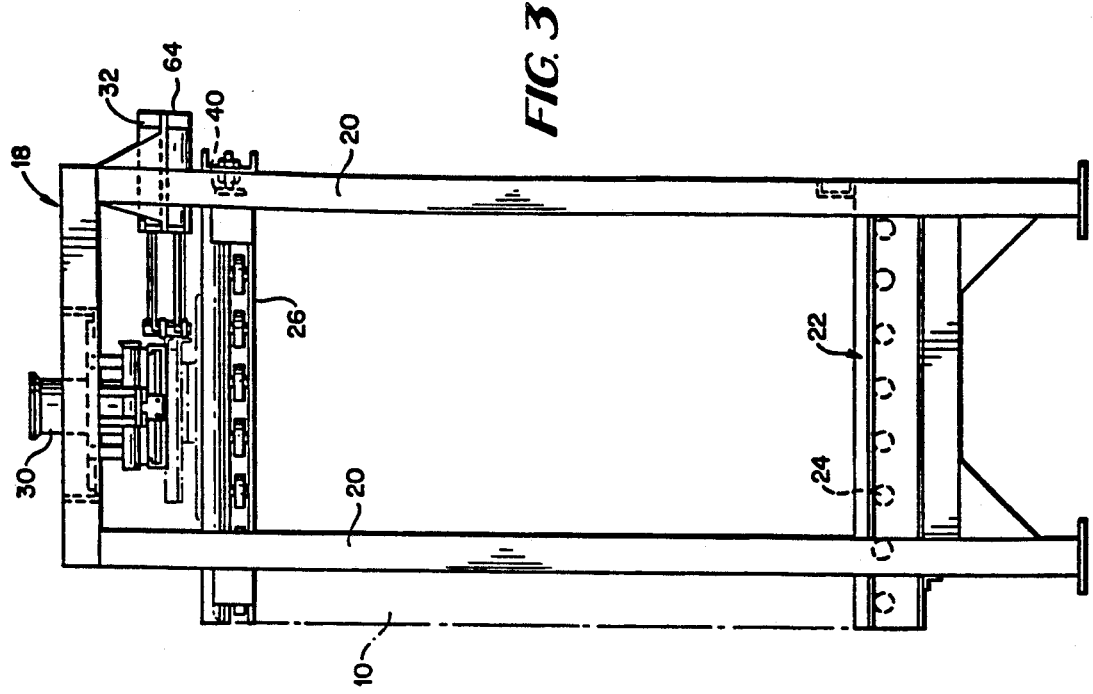
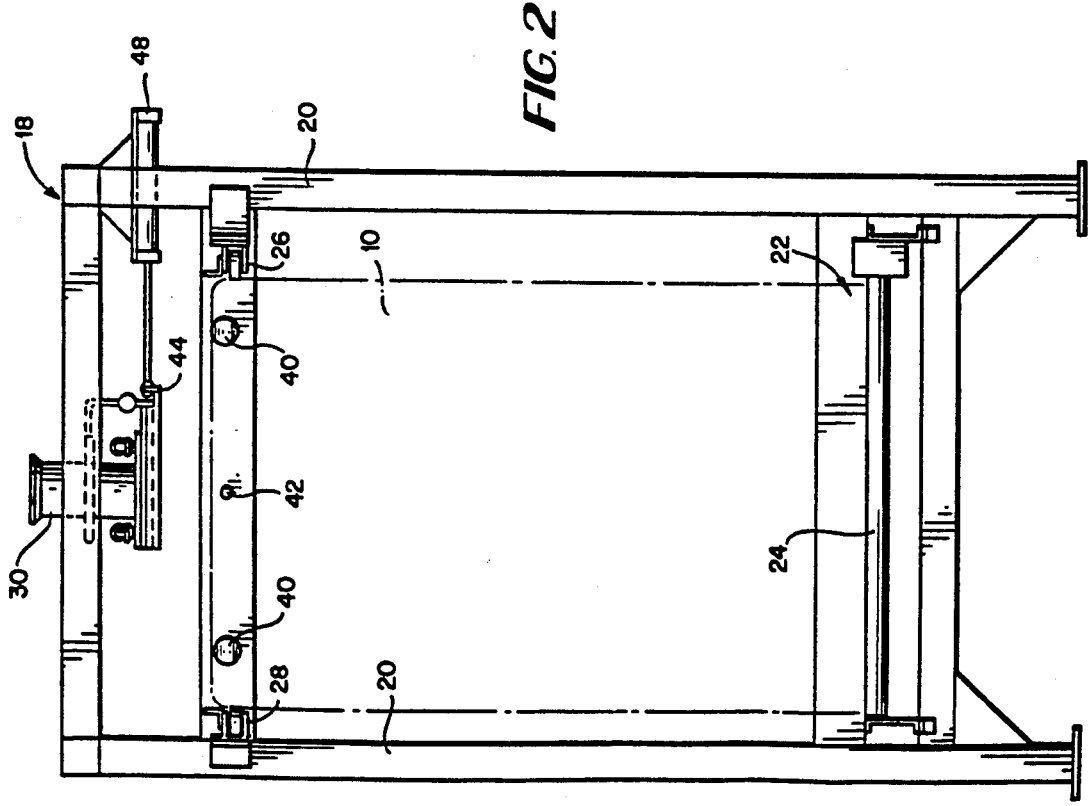

SLIDE GATE AND DUST COVER OPERATOR AND SEAL ASSEMBLY

This is a division of application Ser. No. 727,925 filed Jul. 10, 1991, now U.S. Pat. No. 5,095,954 which is a division of application Ser. No. 07/476,574, filed Feb. 7, 1990, now U.S. Pat. No. 5,042,538.

BACKGROUND AND SUMMARY OF THE INVENTION

The present invention relates to apparatus for providing a dust free environment in the filling and discharge of containers. More particularly, the present invention relates to a slide gate and dust cover operator and seal assembly for use in providing a sealing arrangement for containers of solid materials such as dry powder or tablets.

Previous apparatus for providing a dust free environment for containers is described in the following U.S. Pat. Nos. 3,354,918 to Coleman; 3,729,121 to Cannon; 3,985,245 to Schulte; 4,249,679 to Dillman; 4,428,504 to Bassett et al.; 4,491,253 to Coleman; and 4,830,233 to Thelen et al.

By the present invention, there is provided an improved sealing arrangement which involves a dual seal which seals directly against the gate assembly. In addition, the present invention provides for the introduction of air between the inner and outer seal to prevent contaminants from reaching the product.

BRIEF DESCRIPTION OF THE DRAWINGS

FIG. 2 is a front elevation of the invention as shown in FIG. 1.

FIG. 3 is a side elevation of the invention as shown in FIG. 1.

DESCRIPTION OF THE PREFERRED EMBODIMENTS

In the embodiment of the invention as shown in FIGS. 1 through 11, there is provided a slide gate and dust cover operator and seal assembly having inner and outer seals to prevent contaminants from reaching the product.

Figure 1:
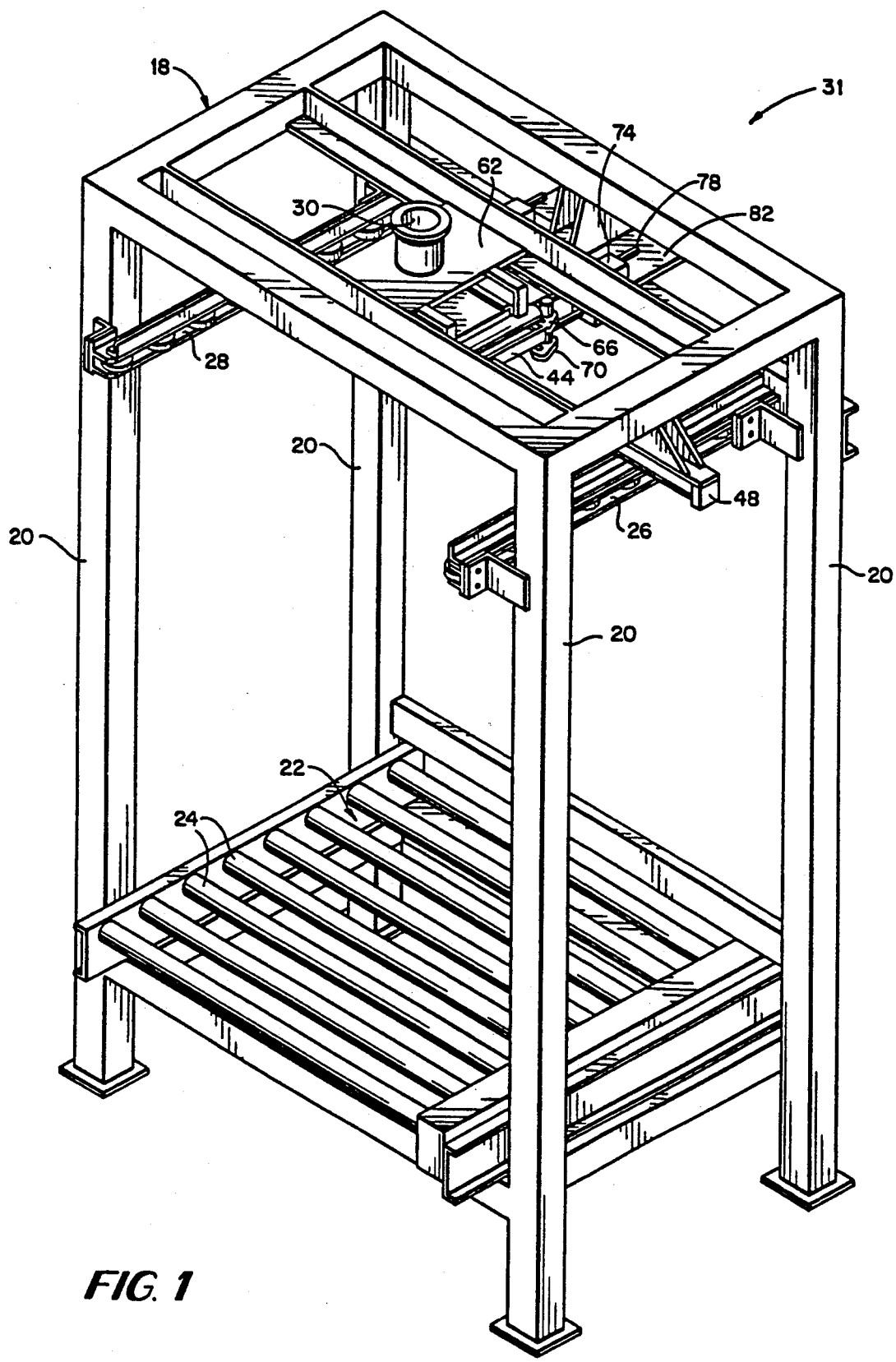
FIG. 1 is a perspective view of the fill station for the slide gate and dust cover operator and seal assembly of the present invention.

In FIGS. 1 through 3, there is shown a support frame assembly 18 of the fill station for a container or bin 10, including vertical members 20 having a roller conveyor assembly 22 with rollers 24 mounted at the lower end and with right and left guide roller assemblies 26, 28 mounted at the upper end of the frame assembly 18. A fill tube and seal assembly 30 is mounted at the top of the frame 18. A slide gate and dust cover operator assembly 31 is also mounted at the top of the frame 18.

Figure 4:
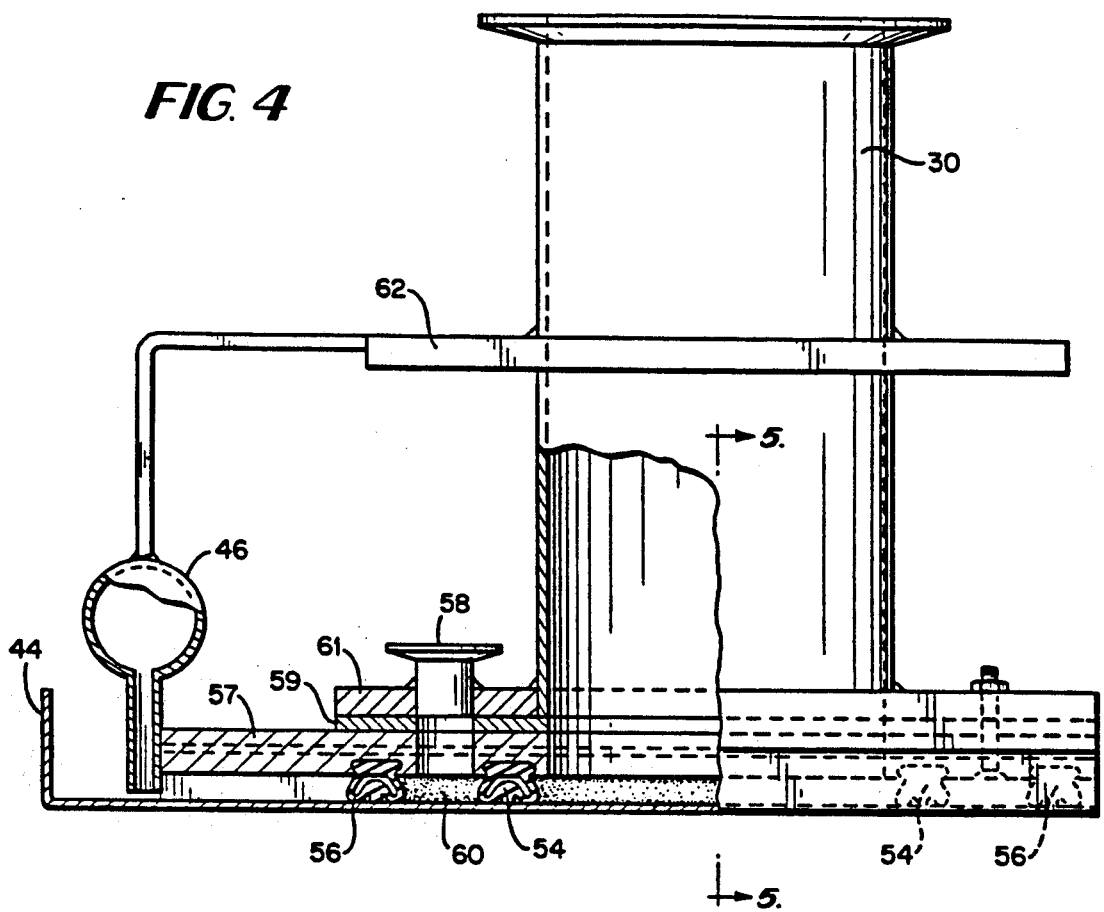
FIG. 4 is a side elevation in partial cross section showing details of the slide gate and dust cover operator and seal assembly of FIG. 1.
Figure 5:
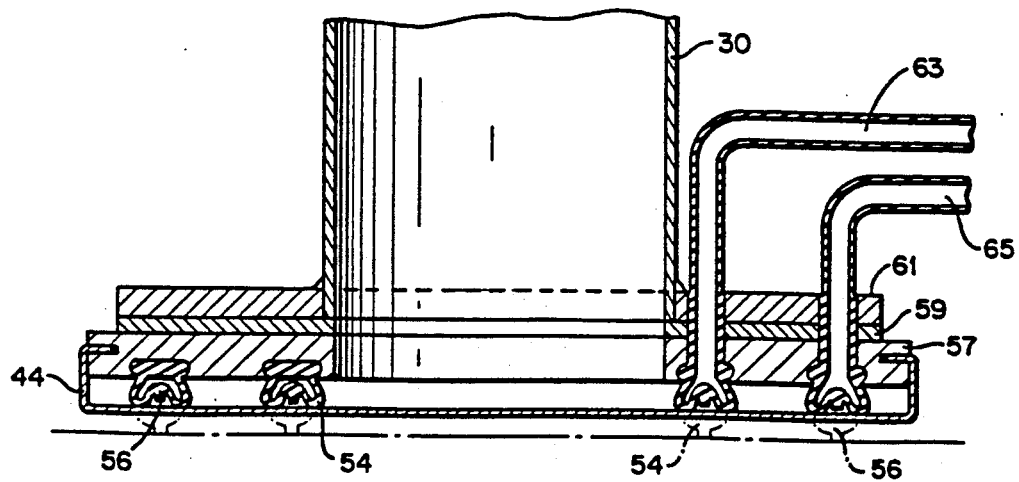
FIG. 5 is a cross section taken along line 5—5 of FIG. 4.

The bin is transferred onto the rollers 24 by an automatically guided vehicle (AGV) or other type transfer vehicle. The bins employed herein may be of stainless steel having a height of about 3 to 8 feet, for example, and a circular, square or rectangular cross-section having a diameter or width of about 2 to 6 feet, for example. The rollers 26, 28 on the side act to guide the bin into position. As shown in FIG. 2, adjustable stops 40 for the bin are provided on the assembly frame, and a proximity sensor 42 is positioned to verify bin position. A dust cover 44, of stainless steel or similar material, is located on the fill station and the cover 44 is in the closed position while the bin is being moved into position- in the fill station. In FIG. 4 all components are shown in the position as would be the case when the bin is first positioned in the fill station of FIG. 1.

In the sequence of steps as carried out while the bin is in the fill station, the vacuum 46 is turned on to clean dust from the dust cover 44. The dust cover 44 on the fill station is pulled back (to right in FIG. 2) by air cylinder 48 to expose the seals. As shown in FIG. 4, a mounting plate 62 supports the filling assembly. A seal retaining flange 57 and a gasket 59 along with a mounting flange for the seal assembly are employed to maintain a sealing environment in conjunction with inner seal 54 and outer seal 56. At the same time, a dust cover 50 on top of the bin (FIG. 11) is pulled back to the open position by cylinder 32 (FIG. 1). Inner seal 54 is then inflated (see FIGS. 4 and 5). The air supply 58 to the chamber 60 is turned on and outer seal 56 is then inflated. Seals 54 and 56 are inflated by air passing from an air supply through tubes 63 and 65. It is pointed out that the order in which the seals 54, 56 are inflated may be reversed, depending on the circumstances. Thus if a toxic product is being handled, for example, it is desirable to keep all the product in while in the case of a food product, it is more advantageous to keep contaminants out.

Figure 11:
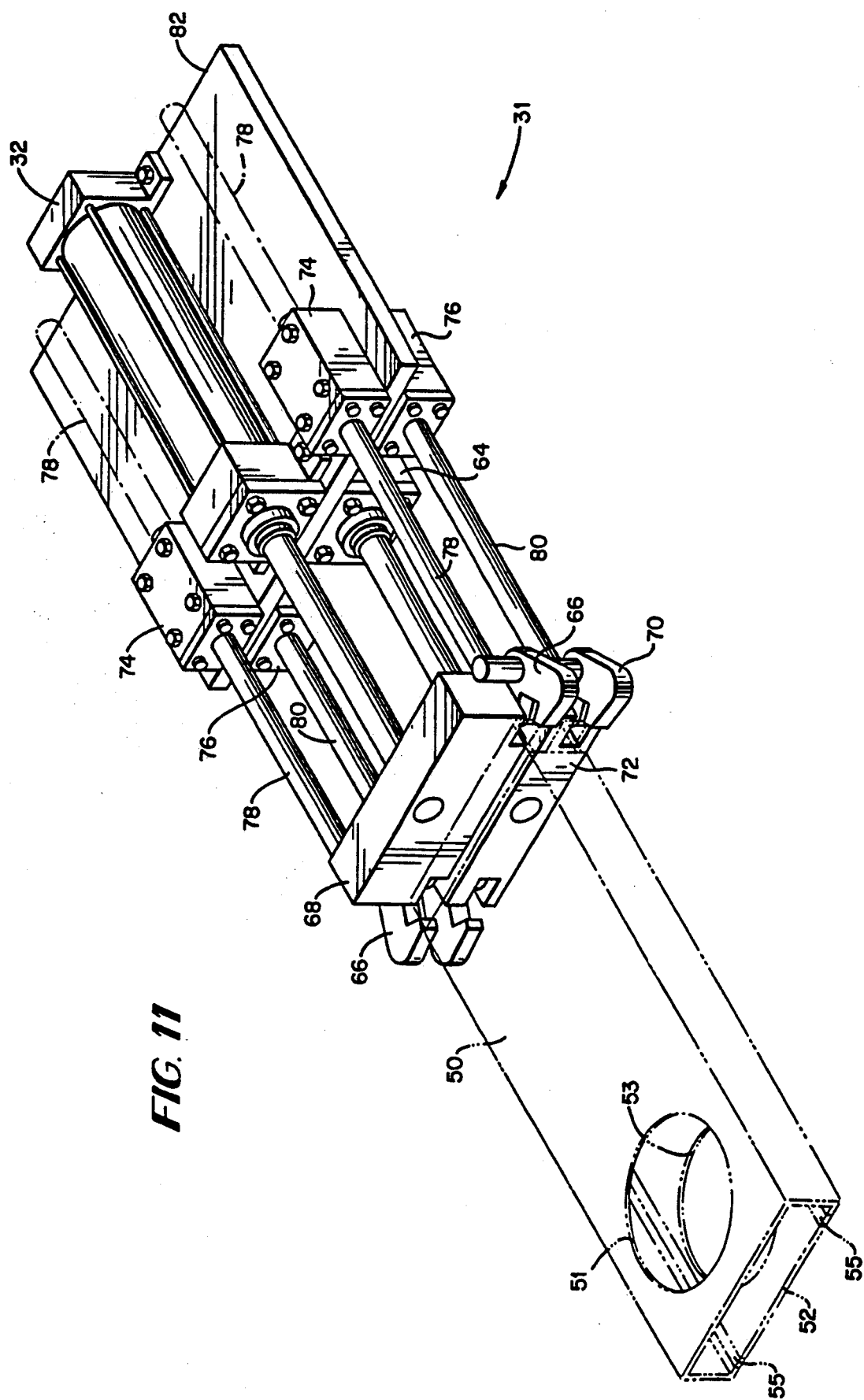
FIG. 11 is a perspective view- of the slide gate and dust cover operator and seal assembly as employed with the fill station of the invention.

Continuing the sequence of steps, the slide gate 52 is opened by the use of cylinder 64 (FIG. 11). The flow of product into the bin may then commence, with product flowing through filling tube 30.

After the bin is filled, the cycle is reversed. The outer seal 56 is deflated, and the positive air supply 58 is turned off. The inner seal 54 is then deflated. Seals 54 and 56 are deflated by allowing air to pass outwardly through tubes 63 and 65.

As shown in FIG. 11, the fill station located above the bin position includes clamps 66 connected to clamp bar 68 for operation by cylinder 32 to control opening and closing of the dust cover 50 on the bin. The opening and closing of the slide gate 52 is controlled by clamps 70 connected to clamp bar 72 for operation by cylinder 64. The slide gate 52 and dust cover 50 are slidably installed with dust tight seal on the top opening of the bin.

Tension block assemblies 74 are mounted on plate 82 with operating rods 78 extending through the blocks 74 and being operatively engaged with clamps 66.

Tension block assemblies 76 are mounted on plate 82 with operating rods 80 extending through the blocks 76 and being operatively engaged with clamps 70.

The tension block assemblies 74, 76 are of conventional construction containing Teflon packings under spring tension to provide proper resistance to motion of the rods 78, 80.

With reference to FIG. 11, when the bin is in position, the dust cover 50 and slide gate 52 will be positioned in the closed position as shown in FIG. 11 adjacent the bars 68 and 72, respectively. Cylinder 32 is operated to pull bar 68. Tension blocks 74 hold rods 78 until clamps 66 have engaged dust cover 50. At that point, the entire assembly is pulled back by cylinder 32 until dust cover 50 is in the open position, with opening 51 aligned with filling tube 30. It is noted that both dust cover 44 and dust cover 50 operate off the same valve so both will open at the same time. Also the dust cover 44 on the fill station is raised above the dust cover 50 on the bin to provide clearance. In a similar manner, cylinder 64 is operated to pull bar 72. Tension blocks 76 hold rods 80 until clamps 70 have engaged slide gate 52. The assembly is pulled back until slide gate 52 is in the open position with opening 53 aligned with opening 51 and filling tube 30. A gasket material 55 is employed in a strip on each side of the slide gate 52 between the slide gate 52 and the dust cover 50. This gasket material 55 may be mounted on the valve at the top of the bin. Thus the slide gate 52 may move freely relative to the dust cover 50.

In carrying out the closing operation for dust cover 50 and slide gate 52, cylinder 64 pushes bar 72 outwardly. Tension blocks 76 hold rods 80, disengaging clamps 70 from the slide gate 52 and bar 72 continues to push the slide gate 52 to the closed position. In a similar manner, cylinder 32 pushes bar 68 outwardly. Tension blocks 74 hold rods 78 which disengage clamps 66 from the dust cover 50. Bar 68 continues to push the dust cover 50 to the closed position.

All positions of the components may be verified by position indicators such as proximity switches mounted on the cylinders.

The main purpose of dust cover 44 is to serve as a collection area to catch residual dust falling from the filling tube. The dust cover 50 on the bin is closed at all times except during filling. The seals 54, 56 can be reinflated when the dust cover is closed to keep the filling tube sealed.

Figure 6:
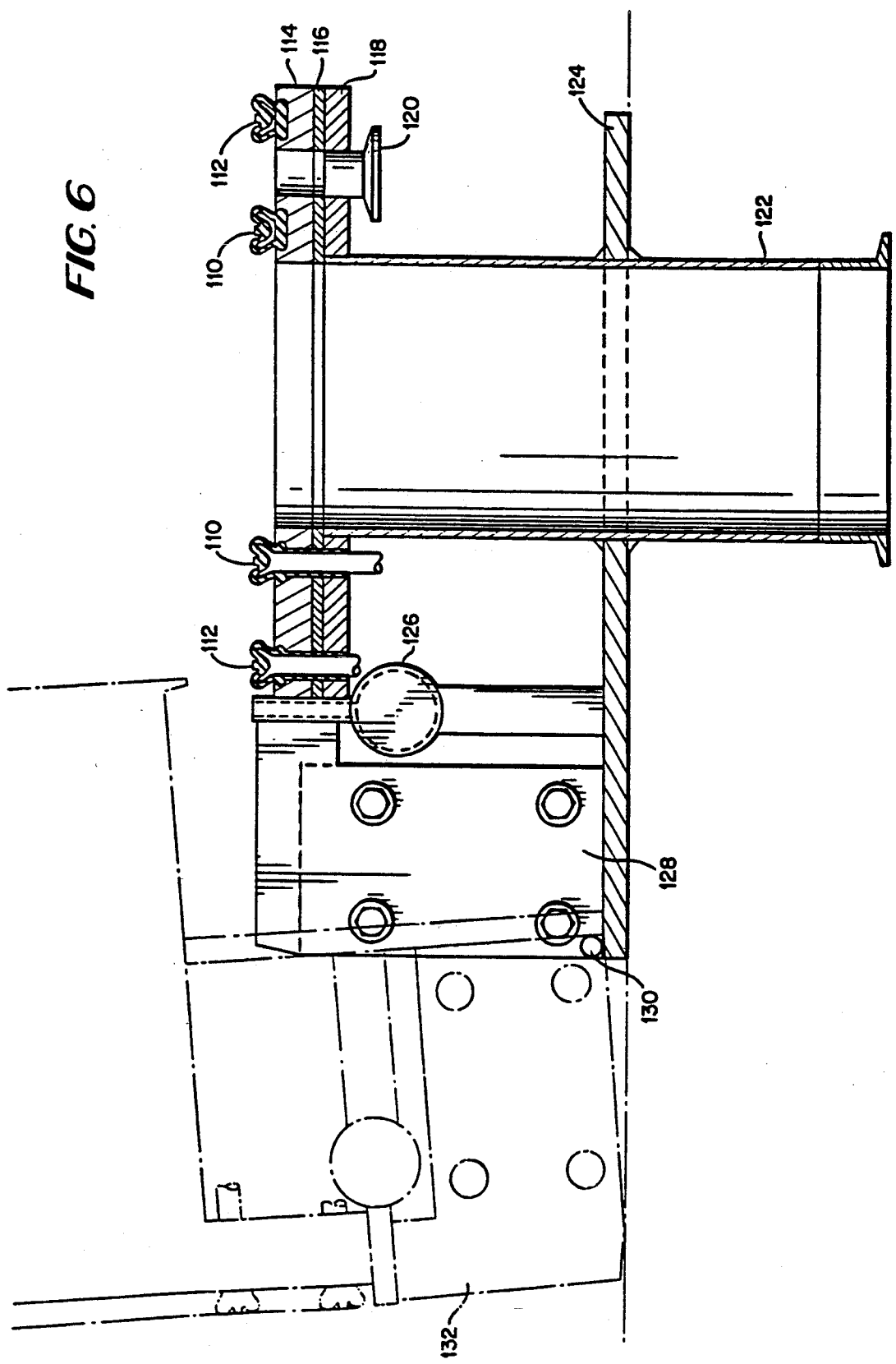
FIG. 6 is a cross sectional view of a portion of the discharge station of the invention.
Figure 7:
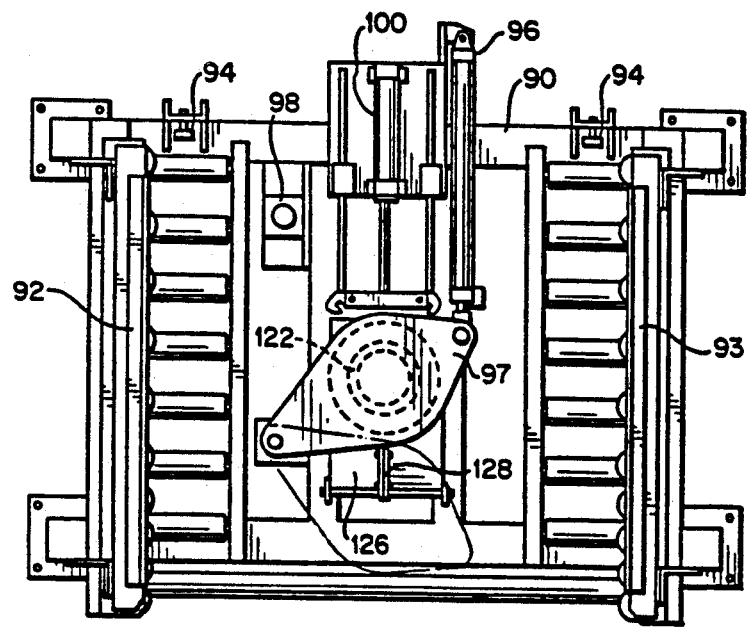
FIG. 7 is a plan view of the discharge station of the invention.
Figure 8:
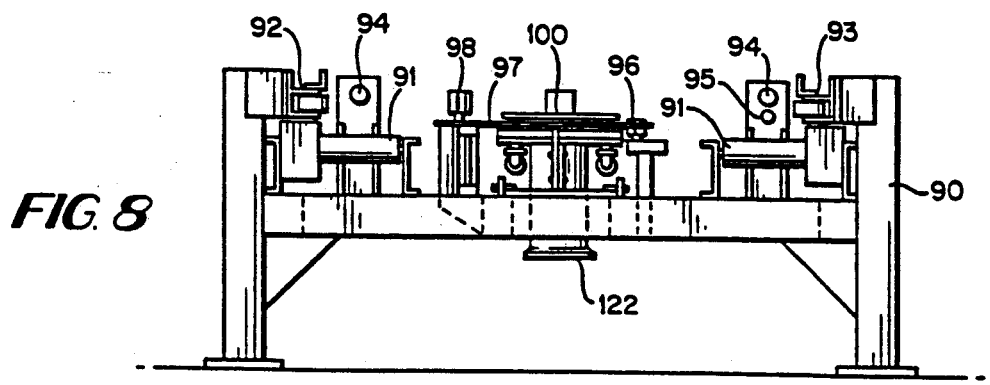
FIG. 8 is a front elevation of the invention as shown in FIG. 7.
Figure 9:
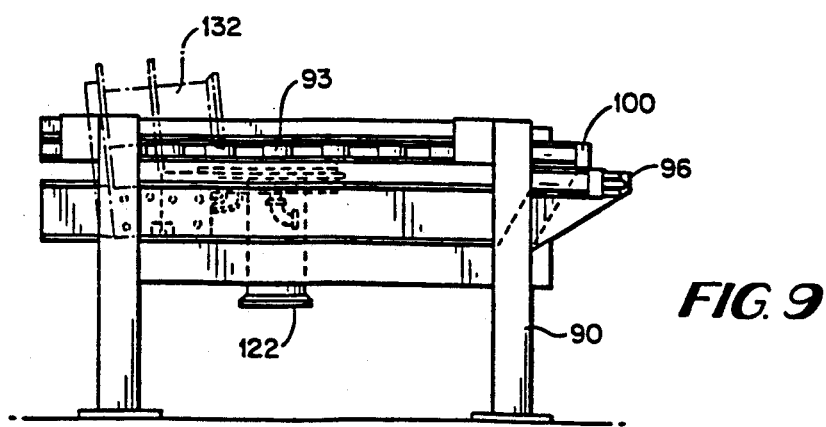
FIG. 9 is a side elevation of the invention as shown in FIG. 7.
Figure 10:
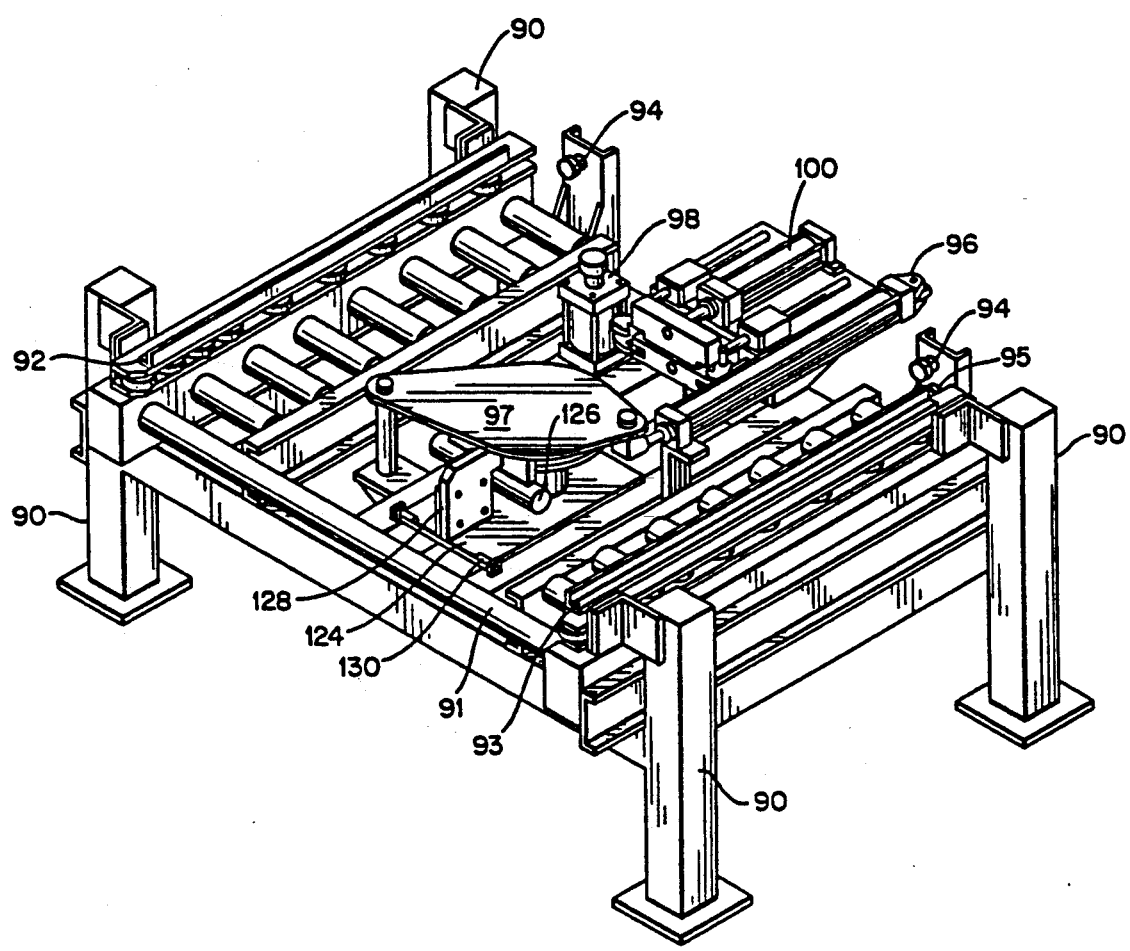
FIG. 10 is a perspective view of the discharge station of the invention.

In FIGS. 6 through 10, there is shown the discharge apparatus for use in discharging solid material from the bottom end of the bin. For this procedure, the bin will be moved to a discharge station having vertical frame members 90, roller conveyors 91, left 92 and right 93 guide rollers, adjustable stops 94 and a proximity switch 95. Movement of the dust cover 97 is controlled by a cylinder 96 so as to pivot between open and closed positions as shown in FIG. 7. A vibrator 98 on the discharge station is controlled by an operator to assist in discharging of the bin.

The bin is provided on its exterior bottom surface with a slide gate and dust cover which are the same as the slide gate 52 and dust cover 50 at the upper end of the bin. The discharge station includes apparatus 100 for operating the slide gate and dust cover on the bottom of the bin which is identical to that shown in FIG. 11 except that it is inverted 180 degrees relative to that shown in FIG. 11.

As shown in FIG. 6, the discharge station is provided with inner 110 and outer 112 seals, in the same manner as for the fill station. A seal retaining flange 114 and gasket in combination with a seal assembly mounting flange 116 act to maintain a sealing environment in conjunction with inner seal 110 and outer seal 112. An air supply coupling 120 provides a source of low pressure air. The discharge tube 122 is mounted in flange 124. A vacuum 126 is provided for use in removing dust. A support block 128 is provided for the hinged dust cover and a hinge rod 130 is provided for the entire discharge tube assembly 132, with the latter being shown in FIG. 6 as tipped over for removal or cleaning.

The fill station conveyor 24 and the discharge station conveyor 91 are powered by a slave drive located on an AGV or transfer type vehicle. Also, both conveyors 24, 91 have an automatically engaged brake when this drive is not in operation. The fill and discharge stations may be located side by side or spaced apart and may be on the same or different levels.

The inner and outer seals for the fill and discharge stations are food grade inflatable rubber in one embodiment. When these seals are inflated, they extend down and engage the valve assembly on the bin.

By following the filling and discharge procedures as set forth herein, the interior of the bin is never exposed to the atmosphere.

To summarize the operation of the invention at the discharge station, a bin is loaded into the discharge station by the use of a powered conveyor. The vacuum automatically begins and cleans the discharge area. When the bin is in the discharge position, the station dust cover opens. The upper cylinder is extended and the clamps are held in place by means of a linkage assembly. The cylinder retracts and the clamps close, thus opening the dust cover on the bin. The inner seal and the outer seal will then inflate. The high volume air begins and the lower cylinder extends and the clamps are held open by means of a second linkage assembly. The cylinder then retracts and the clamps close, thus pulling the slide gate on the bin open. When the bin is empty, the entire procedure is reversed. The discharge head assembly swings out of the way for easy cleaning.

The features of the present invention include the following:

The dual seal prevents product escape;

The introduction of high volume low pressure air in the cavity between the seals keeps the product in and prevents dust from entering from the outside;

The vacuum pickup cleans the dust covers automatically;

The dust cover and slide gate are opened and closed mechanically;

The dust cover and slide gate can be operated independently;

The product area is closed to outside contamination;

The discharge head swings out of the way for easy cleaning;

The device has been approved for use in a pharmaceutical operation; and

The entire assembly can be controlled either manually or by a central computer system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for providing a dust free environment in the filling or discharge of solid materials such as dry powder or tablets into or from a bin or other container, comprising:

a tubular member for receiving materials in the filling or discharge of said solid materials;

a planar member in the form of a seal-retaining flange mounted in fluid tight engagement circumferentially around said tubular member;

an inflatable inner seal mounted in said planar member so as to be positioned circumferentially around said tubular member;

an inflatable outer seal mounted in said planar member so as to be positioned circumferentially around said tubular member and radially outwardly of said inner seal, relative to the longitudinal axis of said tubular member;

air supply means for providing air under pressure to said inner seal;

air supply means for providing air under pressure to said outer seal, separate from said air supply means for said inner seal; and air supply means for providing air under pressure between said inner and outer seals.

2. A method for operating apparatus for providing a dust free environment in the filling or discharge of solid materials such as dry powder or tablets into or from a bin or other container, comprising:

(a) providing a tubular member for receiving materials in the filling or discharge of said solid materials;

(b) providing a planar member in the form of a seal-retaining flange mounted in fluid tight engagement circumferentially around said tubular member;

(c) providing an inflatable inner seal mounted in said planar member so as to be positioned circumferentially around said tubular member;

(d) providing an inflatable outer seal mounted in said planar member so as to be positioned circumferentially around said tubular member and radially outwardly of said inner seal, relative to the longitudinal axis of said tubular member;

(e) providing air supply means for supplying air under pressure to said inner seal;

(f) providing air supply means for supplying air under pressure to said outer seal, separate from said air supply means for said inner seal; and (g) providing air supply means for supplying air under pressure between said inner and outer seals.

* * * * *